No. 732,811. PATENTED JULY 7, 1903.
E. L. ANDERSON.
GALVANIC BATTERY.
APPLICATION FILED JULY 9, 1902.
NO MODEL.
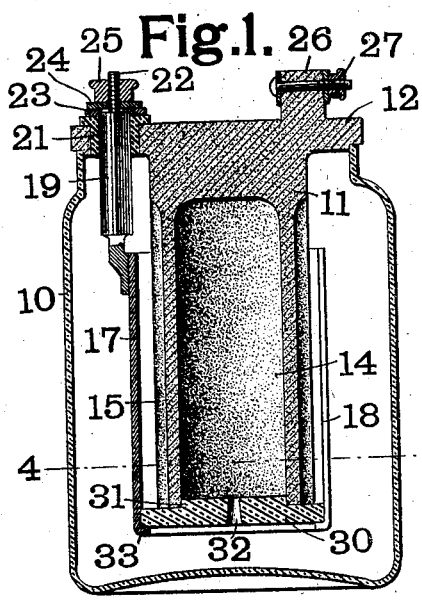
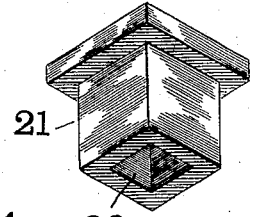
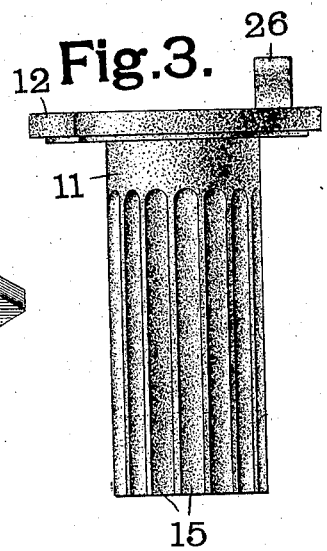
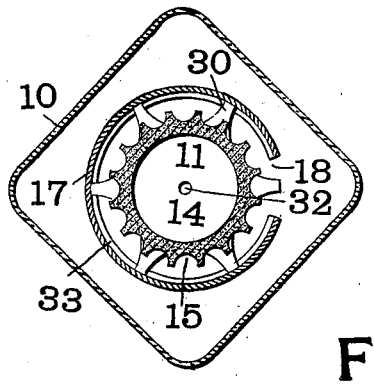
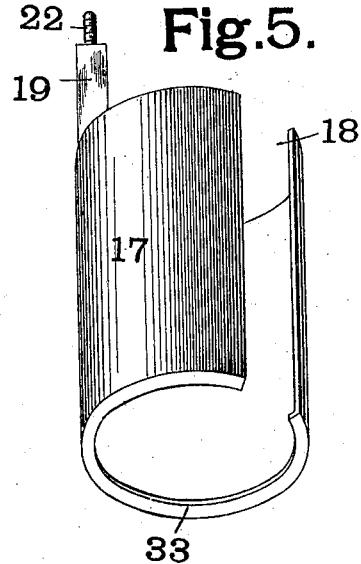
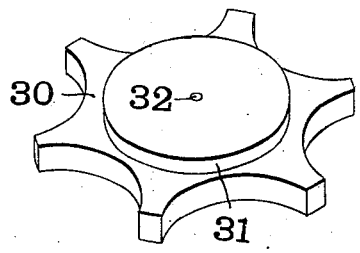
Witnesses
W. A. Alexander
L. B. Beach
Inventor
E. L. Anderson
By Attorneys
Fowler & Bryson No. 732,811. Patented July 7, 1903.

UNITED STATES PATENT OFFICE.

EDWARD L. ANDERSON, OF ST. LOUIS, MISSOURI, ASSIGNOR TO JOHN A. GILLIAM, TRUSTEE, OF ST. LOUIS, MISSOURI.

GALVANIC BATTERY.

SPECIFICATION forming part of Letters Patent No. 732,811, dated July 7, 1903.

Application filed July 9, 1902. Serial No. 114,916. (No model.)

*To all whom it may concern:*

Be it known that I, EDWARD LACEY ANDERSON, a citizen of the United States, residing at the city of St. Louis, in the State of Missouri, have invented a certain new and useful Galvanic Battery, of which the following is such a full, clear, and exact description as will enable any one skilled in the art to which it appertains to make and use the same, reference being had to the accompanying drawings, forming part of this specification.

My invention relates to galvanic batteries, and more particularly to that class of batteries consisting of a carbon and a zinc electrode, the carbon electrode being provided with a depolarizing material.

The object of my invention is to provide a battery of the above-mentioned class which will be simple in construction and in which the charge of depolarizing material can be readily renewed.

In the accompanying drawings, which illustrate one form of battery made in accordance with my invention, Figure 1 is a vertical section. Fig. 2 is an enlarged isometric projection of the porcelain bushing. Fig. 3 is an elevation of the carbon electrode. Fig. 4 is a section on the line 4 4 of Fig. 1. Fig. 5 is an isometric projection of the zinc electrode, and Fig. 6 is an enlarged isometric projection of the removable bottom of the carbon electrode.

Like marks of reference refer to similar parts in the several views of the drawings.

10 represents the jar for containing the electrolyte. This may be of any usual form and is preferably made of glass. Within the jar 10 is the carbon or positive-pole electrode 11. This electrode 11 is supported by means of a cover 12, which rests upon the top of the jar and is preferably formed integral with the said electrode 11. The electrode 11 is cylindrical in form and is hollow, providing a chamber 14 for the reception of the depolarizing material. The outside of the electrode 11 is preferably provided with grooves or flutes 15, so as to increase the surface of the electrode.

Surrounding the positive-pole electrode 11 is the zinc or negative-pole electrode 17. This negative-pole electrode is cylindrical in form. The edges, preferably, do not meet, but leave an open space 18, as best shown in Figs. 4 and 5.

Secured to or formed integral with the zinc electrode 17 is a square stem 19, which passes through a corresponding square opening 20 in a porcelain bushing 21, passing through the cover 12. Projecting above the square stem 19 is a threaded stud 22. Above the bushing 21 is placed a rubber washer or gasket 23, against which bears a metallic nut 24, threaded on the stud 22. Above the nut 24 is a thumb-nut 25, also threaded on the stud 22, and between which and the nut 24 the negative terminal of the line-wire is secured. Formed on the cover 12 is a lug 26, which is provided with a binding device 27 for the positive terminal of the line-wire.

The lower end of the positive-pole electrode 11 is open. It is adapted to be closed by means of a removable bottom 30, of porcelain. This bottom 30 is provided with a boss 31, which projects a slight distance upwardly into the chamber 14. An opening 32 is formed in the bottom 30 for the passage of the electrolyte into the chamber 14. The edges of the bottom 30 rest upon a flange 33, formed on the lower edge of the negative-pole electrode 17, and the bottom is thus supported in position.

In assembling the parts of my battery the positive-pole electrode 11 is inverted, so that the chamber 14 may be filled with the depolarizing material. The bottom 30 is then placed in position and the negative-pole electrode 17 slipped over the positive-pole electrode 11 and the bottom 30. The stem 19 passing through the bushing 21, the gasket 23 and nuts 24 and 25 are now placed in position, firmly binding the flange of the negative-pole electrode 17 against the bottom 30, and thus holding it in position. The two electrodes can now be placed together into the jar 30 containing the electrolyte. When the depolarizing material becomes exhausted, the electrodes are lifted out of the cell and the nuts 24 and 25 removed. The negative-pole electrode 17 can then be lifted off, leaving the bottom 30 free to be removed, so that the depolarizing material can be changed. The bottom 30 acts as a fender, holding the lower end of the negative-pole electrode out of contact with the positive-pole electrode, and the angular form of the stem 19 prevents the electrode from rotating, so that its upper part might come in contact with the positive-pole electrode.

Having fully described my invention, what I claim as new, and desire to secure by Letters Patent of the United States, is—

1. In a galvanic battery, the combination with a hollow positive-pole electrode, of a removable bottom for said electrode, a negative-pole electrode, and means carried by said negative-pole electrode for holding said bottom in position.

2. In a galvanic battery, a hollow positive-pole electrode, a bottom for said electrode, a negative-pole electrode, and a flange on said negative-pole electrode supporting said bottom.

3. In a galvanic battery, a hollow positive-pole electrode, a bottom for said electrode, a negative - pole electrode adapted to bear against said bottom, and an angular stem carried by said negative-pole electrode and passing through a corresponding opening to prevent the rotation of said negative - pole electrode.

4. A galvanic battery having a tubular carbon element, a zinc element embracing the same and provided with a supporting device at or adjacent its lower end, and a disk covering the lower end of said carbon element, and having laterally-extending arms resting upon said supporting device of the zinc element, substantially as specified.

5. A galvanic battery having a tubular carbon element, a zinc element embracing the same and provided with a supporting device at or adjacent its lower end, and a disk covering the lower end of said carbon element, and having laterally-extending arms which form a guard to space apart the two battery elements, and also having arms which rest upon said supporting device of the zinc element, substantially as specified.

In testimony whereof I have hereunto set my hand and affixed my seal in the presence of the two subscribing witnesses.

EDWARD L. ANDERSON. [L. S.]

Witnesses:
W. A. ALEXANDER,
WM. T. JONES.